US012370658B2

(12) United States Patent
Soverns et al.

(10) Patent No.: US 12,370,658 B2
(45) Date of Patent: Jul. 29, 2025

(54) TIN TAG DISPENSER

(71) Applicant: NAS Strategies, LLC, Lake Worth, FL (US)

(72) Inventors: Nicholas Soverns, Lake Worth, FL (US); Raymond Catania, Palm Bay, FL (US); Shaun Kapples, Sebastian, FL (US)

( * ) Notice: Subject to any disclaimer, the term of this patent is extended or adjusted under 35 U.S.C. 154(b) by 140 days.

(21) Appl. No.: 17/896,889

(22) Filed: Aug. 26, 2022

(65) Prior Publication Data

US 2023/0067330 A1 Mar. 2, 2023

Related U.S. Application Data

(60) Provisional application No. 63/237,151, filed on Aug. 26, 2021.

(51) Int. Cl.
*B25C 1/00* (2006.01)

(52) U.S. Cl.
CPC .................................... *B25C 1/006* (2013.01)

(58) Field of Classification Search
CPC .................................. B25C 1/006; B27F 7/02
USPC ...................................................... 227/67, 18
See application file for complete search history.

(56) References Cited

U.S. PATENT DOCUMENTS 3,595,460 A * 7/1971 Pitkin ..................... B25C 1/006 227/112
3,734,377 A * 5/1973 Munn ..................... B25C 1/006 227/120
4,809,568 A * 3/1989 DeCaro ................... B25B 23/10 81/57.37
5,634,583 A 6/1997 McGuinness et al.
5,791,546 A 8/1998 McGuinness et al.
6,065,660 A * 5/2000 Cabrera .................. B25C 1/006 227/18
6,273,315 B1 8/2001 McGuinness et al.
6,302,310 B1 10/2001 Lamb
6,508,392 B1 * 1/2003 Huang .................. B25C 5/1693 227/18
6,779,700 B2 * 8/2004 Bruins .................... B25C 1/006 227/18
6,837,412 B2 1/2005 Lamb
6,908,022 B2 * 6/2005 Schmitz ................ B25C 5/1693 227/18
6,932,260 B1 8/2005 Chou
7,025,241 B2 4/2006 Castellanos
D527,972 S 9/2006 Leasure et al.
7,138,595 B2 11/2006 Berry et al.
(Continued)

*Primary Examiner* — Robert F Long
*Assistant Examiner* — Xavier A Madison
(74) *Attorney, Agent, or Firm* — A. Robert Weaver; The Brickell IP Group, PLLC

(57) ABSTRACT

A tag dispenser may be used for holding and distributing tags near the barrel of a nail gun so that, in use, a nail is deployed through a tag onto a nailing surface. The tag dispense may include a tag housing for holding a plurality of tags and a wiper for pushing the tags towards a tag opening, where a tag may be positioned for a nail to be struck therethrough. The tag housing may be attached to a lower housing where the wiper is housed. The lower housing may be connected to an adapter for attachment to the nail gun. Upon compression of the nail gun, the tag dispenser may compress mechanically pivoting the wiper arm resulting in the tag being placed into the tag opening.

24 Claims, 7 Drawing Sheets

(56) References Cited

U.S. PATENT DOCUMENTS

| | | | | |
|---|---|---|---|---|
| 7,243,440 | B2 | 7/2007 | DeKeyser | |
| 7,344,058 | B2 * | 3/2008 | Bruins | B25C 1/003 227/138 |
| 7,500,588 | B2 | 3/2009 | McGuinness et al. | |
| 2003/0102350 | A1 * | 6/2003 | Liu | B25C 5/1693 227/18 |
| 2003/0173392 | A1 * | 9/2003 | Huang | B25C 5/1693 227/18 |

* cited by examiner

TIN TAG DISPENSER

CROSS REFERENCE TO RELATED APPLICATIONS

This application claims priority to U.S. Provisional Application No. 63/237,151 filed Aug. 26, 2021, the entire contents of which are hereby incorporated by reference.

FIELD OF THE DISCLOSURE

This disclosure relates generally to improvements to power tools, and more specifically improvements allowing for dispensing of tin tags, or a similar object such as a washer, during the operation of a nail gun, or a similar power tool such as an electric screwdriver.

BACKGROUND

A nail gun is a commonly used power tool employed for high-powered nailing of building or construction material. Nail guns are typically pneumatically driven by a pressurized compressor resulting in the forcible driving of the nail, or a similar fastener, into the material.

Roofing installation and repair is a common application for nail guns. A Metabo® Coil Roofing Nailer is an example of a commonly used nail gun employed in roofing applications. FIG. 1 is an illustration of a prior art nail gun 10 based on the Metabo® Roofing Nailer. A prior art nail gun 10 includes a piston or motor 12 connected to a shaft 14. A canister 16 for housing a chain of nails 2 is also connected to the shaft 14. Nails 2 are stored in a coil, with each nail connected to an adjacent nail by a piece of breakable connective material thereby forming a coiled chain. The chain of nails 2 is fed from canister 16 towards shaft 14 through a feed 18, which is acutely angled with respect to shaft 14. Piston 12 then operates to drive one of the nails 2 through a distal end of shaft 14 and into a construction material 4. A handle 20 is also provided for a user to grip gun 10, and near the handle is a trigger 22 for activating the gun. Additionally, a pressure sensor 24 is provided on or proximate to the shaft 14 as a safety feature. Generally speaking, pressure sensor 24 is positioned at the distal end of shaft 14 and pressed upwards and into shaft 14 as the distal end of shaft 14 is pressed against construction material 4. Upon detection of the force from material 2 being pressed against the distal end of shaft 14, pressure sensor 24 permits the gun 2 to be activated. This is a safety feature that prevents accidental discharge of a nail 2 from shaft 14 when it is not pressed against construction material 4.

Thin cylinders, more commonly referred to as tin tags in the roofing industry, are commonly applied to the construction material prior to a nail being nailed to the material. Tin tags are used to hold down the felt on the roof material. Presently, a user of a nail gun will manually align the tin tag on the area of the roof which is to-be nailed. User alignment, however, can be inaccurate and often requires two people—one to hold and operate the gun, and one to place and hold the tin tag. This manual method of alignment is inefficient and a safety hazard, particularly for the user holding the tin tag. Some efforts have been made to develop tin tag dispenser attachments, examples of which are disclosed in U.S. Pat. No. 6,837,412 to Lamb and U.S. Pat. No. 7,025,241 to Castellanos, and the contents of each are hereby incorporated by reference in their entirety. None of the prior art solutions have been commercially successful, most likely because they have been failure prone or cost prohibitive.

Accordingly, a new solution is needed for the automatic alignment and dispensing of tin tags, or similar materials such as washers, for use with power tools in building and construction applications.

BRIEF SUMMARY OF THE DISCLOSURE

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

In one embodiment of the disclosure a tag dispenser for a nail gun may include a tag housing and a lower housing connected with the tag housing. The tag housing may include an internal compartment dimensioned to store a plurality of tags. The lower housing may include a pivotable wiper and a tag opening, the wiper operable to push a tag from a bottom end of the tag housing into the tag opening. A shaft of the nail gun may be positioned proximate the tag opening such that a nail is deployable from the nail gun through the tag opening.

In another embodiment of the disclosure a nail gun may include a gun shaft through which a nail may be deployed from a distal end of the shaft, a lower housing positioned proximate the distal end of the shaft, and a tag housing connected with the lower housing. The lower housing may include a pivotable wiper and a tag opening, with the tag opening positioned adjacent the gun shaft in a path of nail deployment. The tag housing may include an internal compartment dimensioned to store a plurality of tags and positioned to feed the plurality of tags from the tag housing to the lower housing. The wiper may be operable to push a tag from a bottom end of the tag housing into the tag opening.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

DETAILED DESCRIPTION OF THE DISCLOSURE

Figure 1:
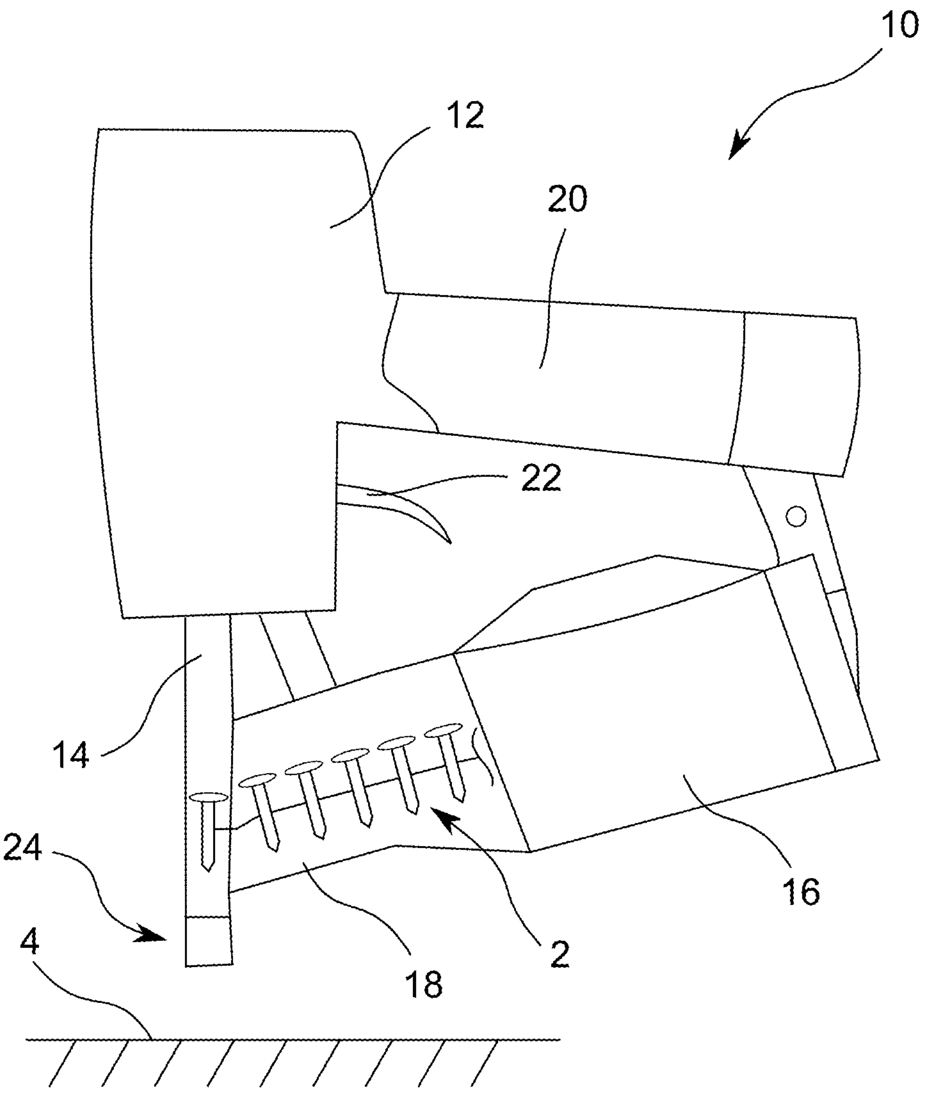
Fig. 1 Prior Art
FIG. 1 illustrates a side view of a prior art nail gun, with a portion of the shaft and feed transparent to show the positioning of nails within.

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

In one embodiment of the disclosure a tag dispenser for a nail gun may include a tag housing and a lower housing connected with the tag housing. The tag housing may include an internal compartment dimensioned to store a plurality of tags. The lower housing may include a pivotable wiper and a tag opening, the wiper operable to push a tag from a bottom end of the tag housing into the tag opening. A shaft of the nail gun may be positioned proximate the tag opening such that a nail is deployable from the nail gun through the tag opening.

In another embodiment of the disclosure a nail gun may include a gun shaft through which a nail may be deployed from a distal end of the shaft, a lower housing positioned proximate the distal end of the shaft, and a tag housing connected with the lower housing. The lower housing may include a pivotable wiper and a tag opening, with the tag opening positioned adjacent the gun shaft in a path of nail deployment. The tag housing may include an internal compartment dimensioned to store a plurality of tags and positioned to feed the plurality of tags from the tag housing to the lower housing. The wiper may be operable to push a tag from a bottom end of the tag housing into the tag opening.

In further embodiments, the tag housing may include a cap covering the internal compartment and a plunger having a plunger head within the internal compartment and a plunger shaft extending through an opening in the cap. The lower housing may include an upper segment and a joined lower segment, the upper segment including a tag housing aperture dimensioned to connect with the tag housing. The wiper arm may include an edge for contacting the tag at the bottom end of the tag housing. The wiper may include a wiper shaft extending through a wiper opening provided on the upper segment, and the wiper pivots about a vertical axis extending through the wiper shaft. Upon forcing the adapter towards the lower housing, the wiper shaft and barrel may telescope and the pin traverses along the slot thereby pivoting the wiper. A stability shaft and a stability barrel may connect the adapter with the lower housing, the stability shaft and stability barrel telescope upon forcing the adapter towards the lower housing. The stability shaft and stability barrel may connect with the lower segment of the lower housing. The wiper may pivot between a deployed and stored position, and in the deployed position the wiper blocks at least a portion of the bottom end of the tag housing. The lower segment of the lower housing may include a well and a pad positioned with the well. The wiper edge may include a lip have a shape complimentary to the tag.

Figure 2:
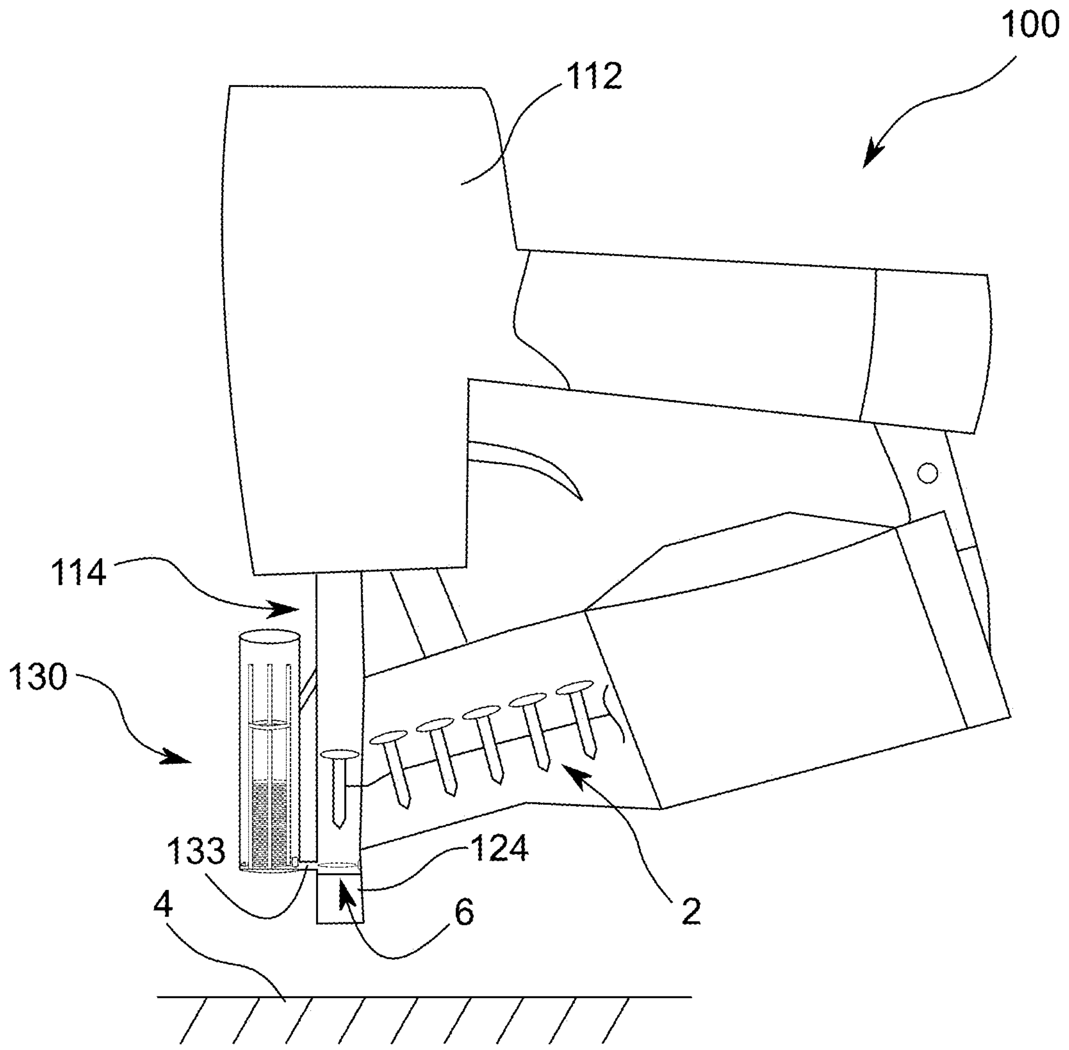
FIG. 2 illustrates a side view of a nail gun in accordance with an embodiment of the disclosure, with a portion of the shaft, feed, and tag housing transparent to show the positioning of nails and tin tags within.
Figure 3:
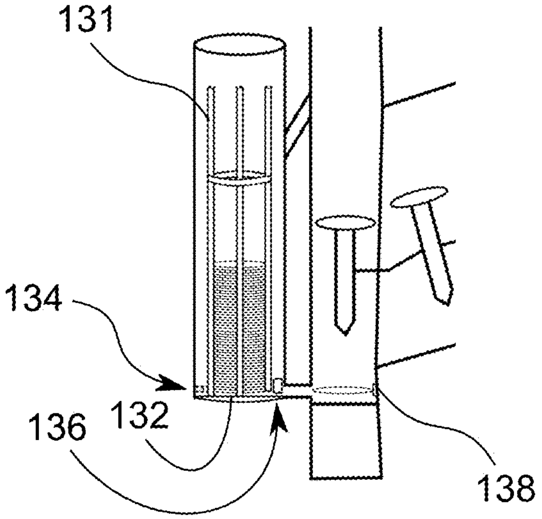
FIG. 3 is an enhanced view of the nail gun of FIG. 2 at the distal end of the shaft.

Referring now to FIGS. 2 and 3, a nail gun 100 may include a tag housing 130 attached to a shaft 114. Tag housing 130 may be sized and dimensioned to hold a plurality of tin tags 6. As illustrate, tag housing 130 is cylindrical and vertically oriented, however other dimensions and orientations are contemplated within the disclosure. While tin tags are cylindrical, it is within the scope of the disclosure for housing 130 to hold non-cylindrical elements that are to be nailed to construction material 4. Housing 130 may have conforming dimensions to whatever dimensions tags 6 may have. For example, if a metallic nut has a hexagonal cross section is to be nailed to construction material 4, housing 130 may have a conforming, hexagonal cross section. Housing 130 may also have an orientation of vertical, as shown in the illustrated embodiment. Housing 130 may be angled or sloped so long as housing 130 is slightly or partially vertical so as to allow tags 6 to be gravity fed towards the bottom of housing 130. In some embodiments, tags 6 sit within housing and directly contact interior walls of housing 130. In further embodiments, such as the illustrated embodiment, the internal diameter of housing 130 may be wider than the diameter of tags 6 and housing 130 may include an internal holder 131 whose internal dimensions conform to the dimensions of the stack of tags 6. In the illustrated embodiment, holder 131 is composed of a plurality of longitudinal rods projecting from a base platform 132. The stack of tags 6 accordingly rest on base platform 132 and maintain a stacked alignment by virtue of internal holder 131. Inclusion of internal holder 131 may facilitate the inclusion of other components directly within housing 130 as contemplated within the disclosure.

A tag passage 133 may be provided at or near the bottom end of housing 130 to permit passage of tags 6 from housing 130 to gun shaft 114. Within, or proximate to, tag passage 133 may be a feed lever 134 and a roller 136. Feed lever 134 may be a movable wedge or blade that forcibly contacts a bottom tag 6 thereby pushing it towards shaft 114. Roller 136 may frictionally grab tag 6 and facilitate the pushing of the bottom tag 6 into shaft 114. In the illustrated embodiment, feed lever 134 is a pivotable blade having a distal end dimensioned to contact the perimeter of the bottom tig tag 6 of the stack of tags. The blade of lever 134 operates to push tig tag towards tag passage 133. A gap in the internal holder 131 may facilitate the blade's entry into holder 131, for example the blade may be dimensioned to fit between the longitudinal rods of holder 131. A gap in holder 131 may also be provided proximate passage 133 to permit the tag 6 exiting holder 131. Consequentially, lever 134 may pivot towards internal holder 131 striking, and thereby pushing, a bottom tag 6 from internal holder 131 towards tag passage 133 by sliding the tag 6 along base platform 132, and then lever 134 may reverse pivot to its stored position allowing another tag 6 to drop, by gravity force, onto the base platform 132 replacing the tag that had just been dispensed.

Roller 136 may be provided between internal holder 131 and tag passage 133. Roller may be a powered wheel that operates to frictionally contact tag 6 at its top surface and push tag 6 through passage 131 and into shaft 114. Once in shaft 114, tag 6 may be aligned within shaft 114 by an alignment mechanism 138. One embodiment of an alignment mechanism is a magnet, or a series of magnets. Another embodiment of an alignment mechanism is a plurality of ledges that tag 6 can rest on, with a sufficient internal gap that allows the tag to slightly deform and push into as the nail is launched into tag 6.

The process of dispensing tags 6 may be automated in conjunction with the other mechanical features of nail gun 100. For example, lever 134 may be activated and moved into a deployed position in conjunction with the pneumatic motor 112 deploying a nail 2, and the lever 134 may be retracted into a stored position in conjunction with the pneumatic motor reloading a nail 2 as timed with the withdrawal of shaft 114 from construction material 4. In another embodiment, lever 134 may be connected to pressure sensor 124 such that it actuates between deployed and stored positions as the pressure sensor is activated and deactivated during operation of the gun.

In embodiments where gun 100 includes a pressure sensor 124, it should be appreciated that tag housing 130 must be positioned so as not to interfere with the pressure sensor 124. Consequentially, it is appreciated that the illustrated position of tag housing 130 at a front side of nail gun 100 may interfere with unillustrated components of pressure sensor 124. Accordingly, it is contemplated within the disclosure that housing 130 may be situated on lateral sides of the gun as opposed to the front of the gun as illustrated.

Figure 4:
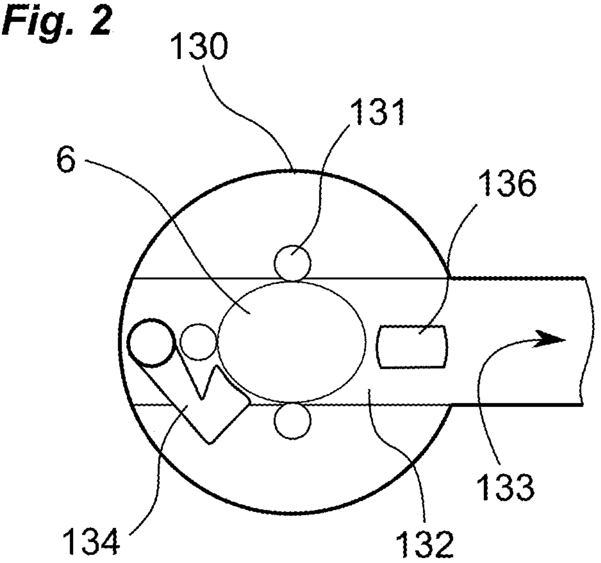
FIG. 4 is a top view of the tag housing of the nail gun of FIG. 2.
Figure 5:
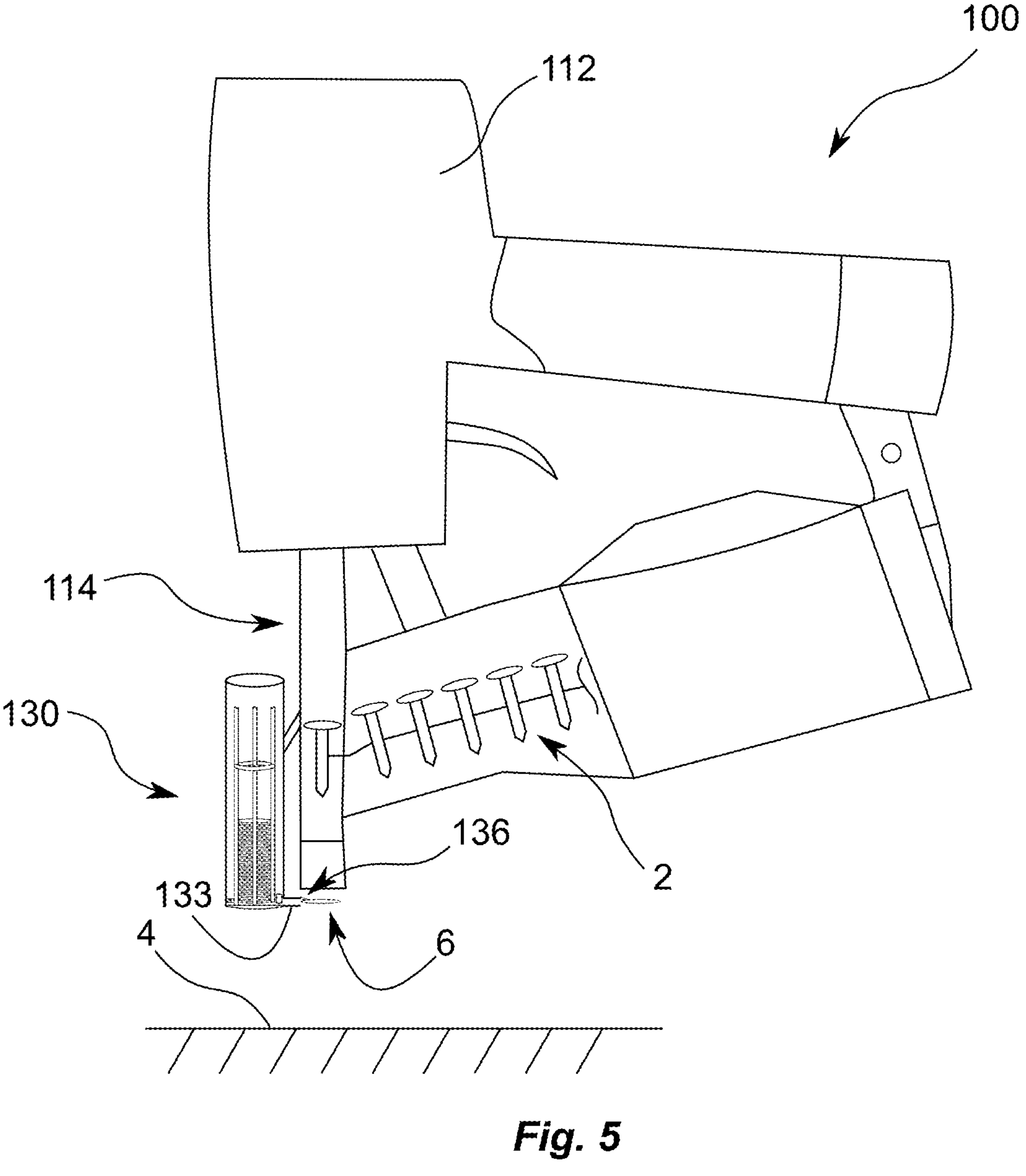
FIG. 5 illustrates a side view of a nail gun in accordance with an additional embodiment of the disclosure, with a portion of the shaft, feed, and tag housing transparent to show the positioning of nails and tin tags within.
Figure 6:
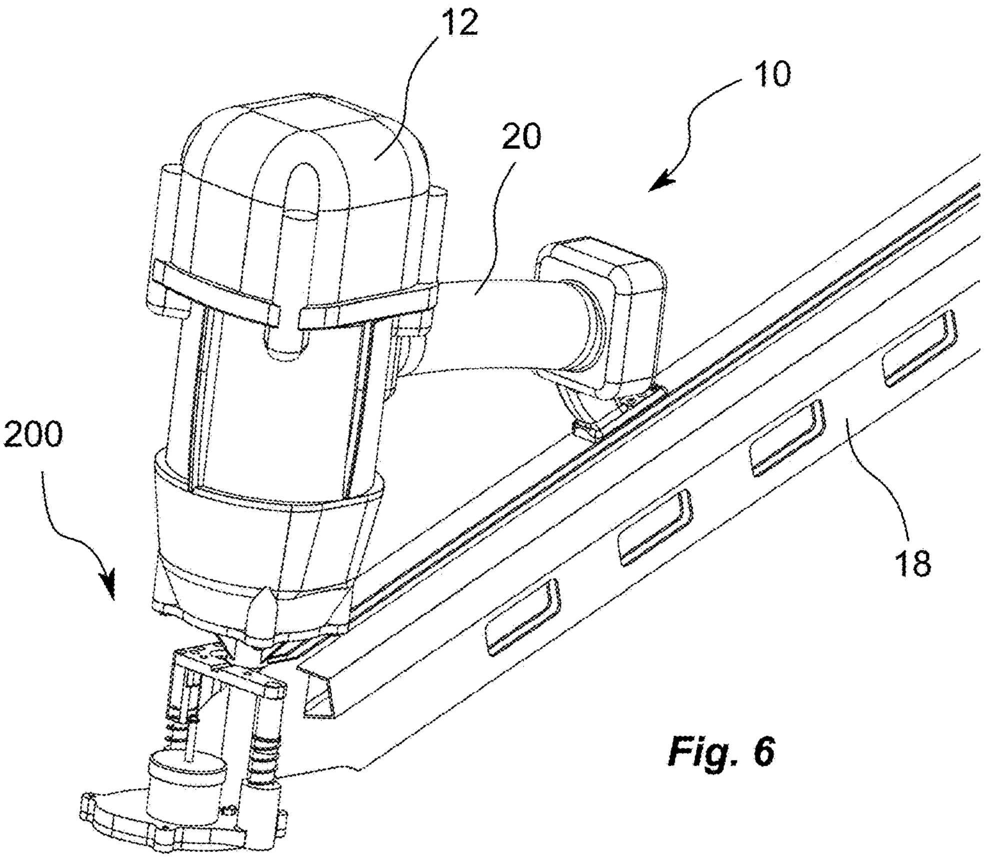
FIG. 6 illustrates a top-front perspective view of a nail gun with an attached tag dispenser in accordance with an embodiment of the disclosure.
Figure 7:
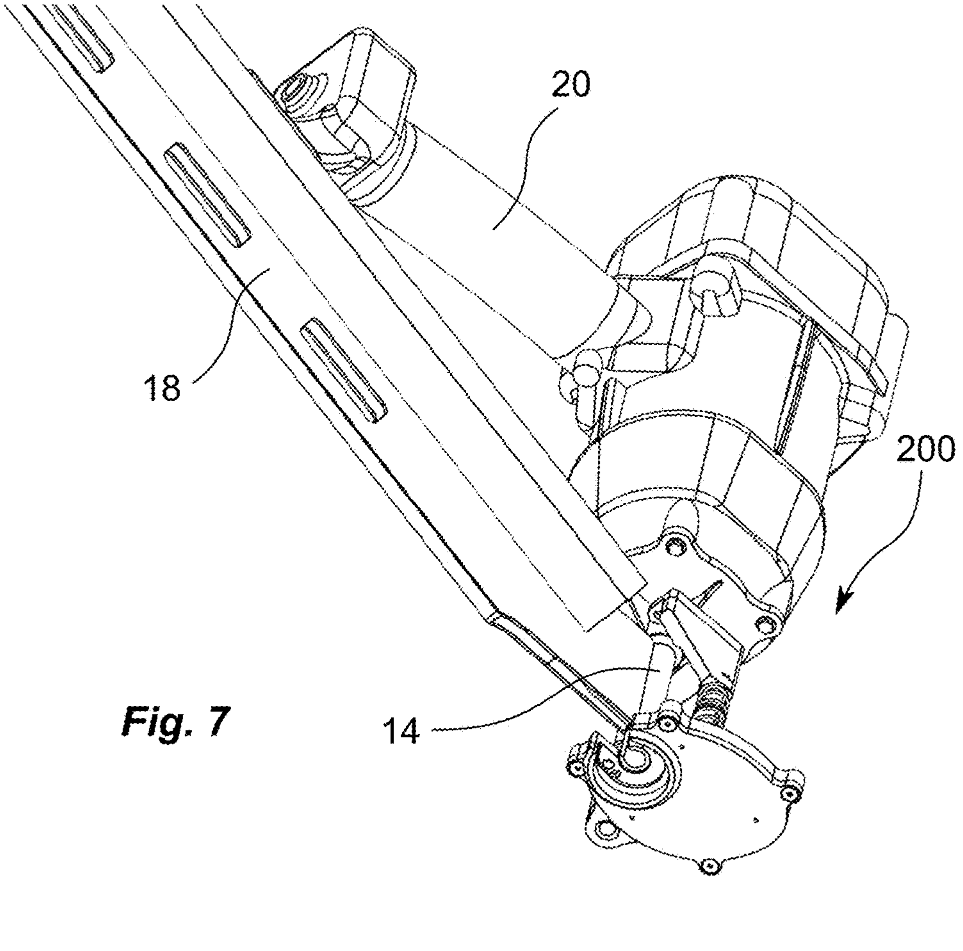
FIG. 7 illustrates a bottom-rear perspective view of the nail gun with attached tag dispenser of FIG. 7.
Figure 8:
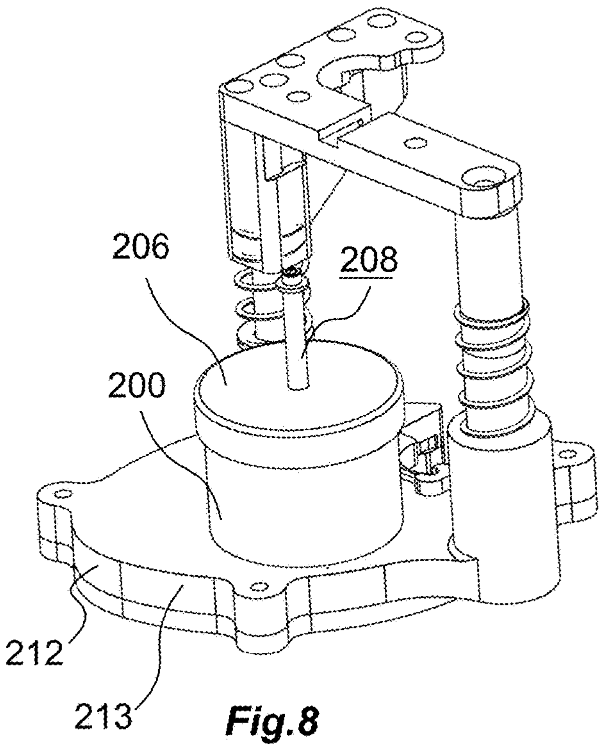
FIG. 8 illustrates a top-front perspective view of the tag dispenser of FIG. 6.
Figure 9:
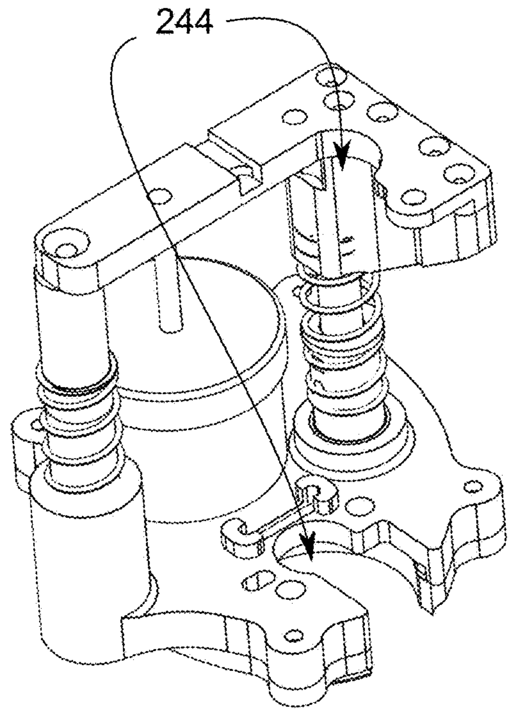
FIG. 9 illustrates a top-rear perspective view of the tag dispenser of FIG. 6.
Figure 10:
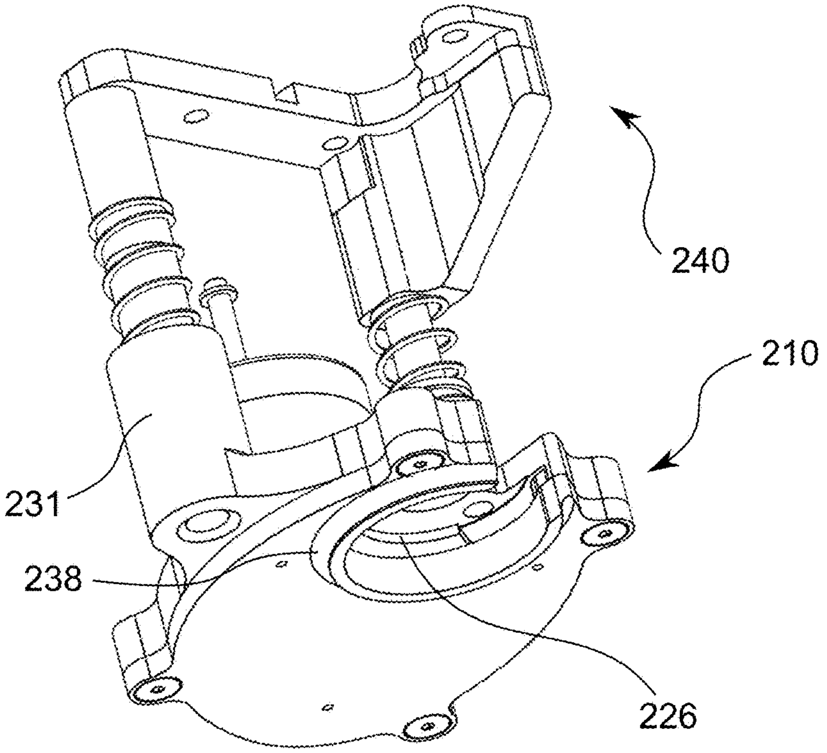
FIG. 10 illustrates a bottom-rear perspective view of the tag dispenser of FIG. 6.
Figure 11:
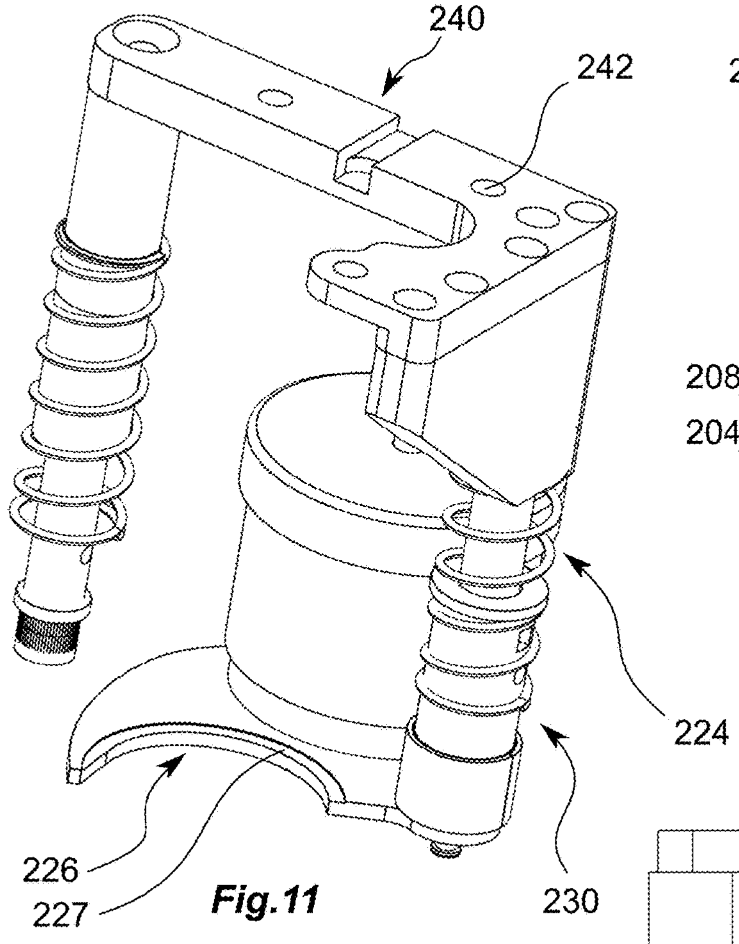
FIG. 11 illustrates a top-rear perspective view of the tag dispenser of FIG. 6 without the lower housing.
Figure 12:
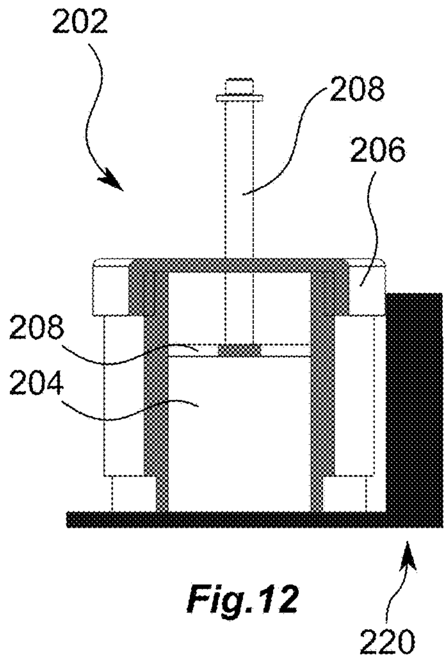
FIG. 12 illustrates a side view of a vertical cross section of a tag housing and a feeder of the tag dispenser of FIG. 6.

In avoiding interference with pressure sensor 124, it should be further appreciated that passage 131 may be positioned either above or below pressure sensor 124 so as not to interfere with its displacement at the end of shaft 114. FIG. 4 shows an additional embodiment where passage 133 is positioned below shaft 114 such that tags 6 are dispensed below and outside of shaft 114. This may be particularly utilized where tags 6 are significantly larger in diameter than shaft 114. In this embodiment, alignment mechanism 138 may be a magnet situated at the end of passage 133 and positioned to hold tag 6 in alignment over shaft 114.

With reference now to FIGS. 6-16, an embodiment of a tag dispenser 200 is shown as attachable to embodiments of prior art nail guns 10. It should be readily apparent to a person of ordinary skill in the art that tag dispenser 200 shares several features and components with the aforementioned inventive nail gun 100 in order to effectively position tags 6 between the path of a nail gun shaft 14 and a surface 4 such that a tag 6 may be nailed to surface 4 by a nail 2 from operation of the nail gun.

Tag dispenser 200 may include a tag housing 202 having an inner compartment 204 dimensioned to store a plurality of tags 6, a tag housing cap 206 for covering the inner compartment, and a plunger 208 having a head situated within the inner compartment and a shaft extending through tag housing cap 206. The inner compartment 204 may have a complimentary shape with the tags 6 to be stored within tag housing. The head of plunger 208 may also have a complimentary shape with the tags 6. A spring (not shown) between the head of plunger 208 and an underside of housing cap 206 may be utilized to forcibly push the stored tags towards the bottom of tag housing 202. The shaft extending through cap 206 as part of plunger 208 may also serve as an indicator the user of approximately the number of tags 6 remaining in the housing. Markings, not shown, on the shaft may be utilized to assist the user with determining the number of tags remaining. A ring or stop may be provided on the distal end of the shaft to avoid the head of plunger 208 from overly descending into the tag housing 202, which can prevent plunger 208 from being damaged by the components such as a feeder 220. Tag housing may be attached or integrated onto lower housing 210.

A lower housing 210 may include an upper segment 212 connected with a lower segment 213. Upper segment 212 may include a tag housing aperture 214 which is attached or integrated with tag housing 202. As such, tag housing aperture 214 may have complimentary dimensions as the outer surface of tag housing 202. Lower segment may include a well 215 within its upper or interior surface, and a complimentarily shaped pad 216 may be situated within well 215. In use, tags being gravity or force fed from tag housing 202 into lower housing 210 may rest on pad 216 prior to deployment as shown and described.

A wiper or feed lever 220 may be utilized to deploy or transfer tags within lower housing 210 into a tag opening or hopper 222 provided as part of lower housing 210. Hopper 222 may be integrally formed on the exterior of lower housing 210 and may be sized and dimensioned to accommodate the tags being deployed. Wiper 220 may include a hook or catch 223 and a pivot shaft 224 rotatable within a wiper opening provided on the upper segment 212. Hook 223 may included an arcuate edge 226 having a complimentary shape to a tag.

Figure 16:
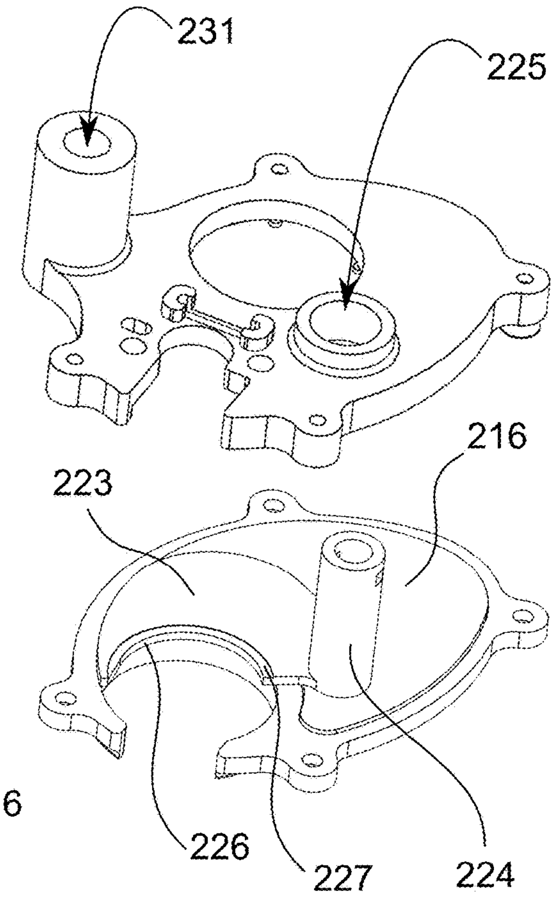
FIG. 16 illustrates an exploded top-rear perspective view of the lower housing and feeder shown in FIG. 15 with the top segment of the lower housing separated from the lower segment of the lower housing.

Wiper 220 may operate to transfer a tag from tag housing 202 to tag opening 222 by rotating along an axis defined through shaft 224. In FIG. 16, wiper 220 is shown in a deployed position with edge 226 adjacent tag opening 222. Wiper 220 may be rotated clockwise to a stored position adjacent to tag housing aperture and an inserted tag housing 202. Edge may have a complimentary shape with a portion of the inner compartment 204 of tag housing 202. In some embodiments, such as the illustrated embodiment, edge 226 may include a lip 227 that accommodate a tag. Thus, in the stored position a tag may fall onto lip 227 and then wiper 220 may rotate counterclockwise towards its deployed position proximate tag opening 222. Alternatively, edge 226 may not have a lip and the tags may rest on pad 216 when wiper 220 is in the stored position. It should be appreciated that the interior of lower housing 220 is designed to accommodate the crescent like shape of wiper 220. It should also be appreciated that a portion of wiper 220 remains between tag housing 202 and pad 216 in the deployed position thereby preventing tags from falling below wiper 220, as shown for instance in FIG. 11.

Deployed tags may be held within tag opening 222 in anticipation of a nail from the nail gun being struck through the tag onto a surface. In that respect, the circumference or shape of tag opening 222 may be slightly less than the tags but include an internal slot for an edge of the tag to fit within thereby holding a deployed tag within tag opening 222. Lip 227 of the edge 226 of the wiper 220 may also promote stabilization and holding of a tag. It is further contemplated that edge 226 or lip 227 may be magnetized, or include magnets, to promote stabilization of the tags.

Figure 13:
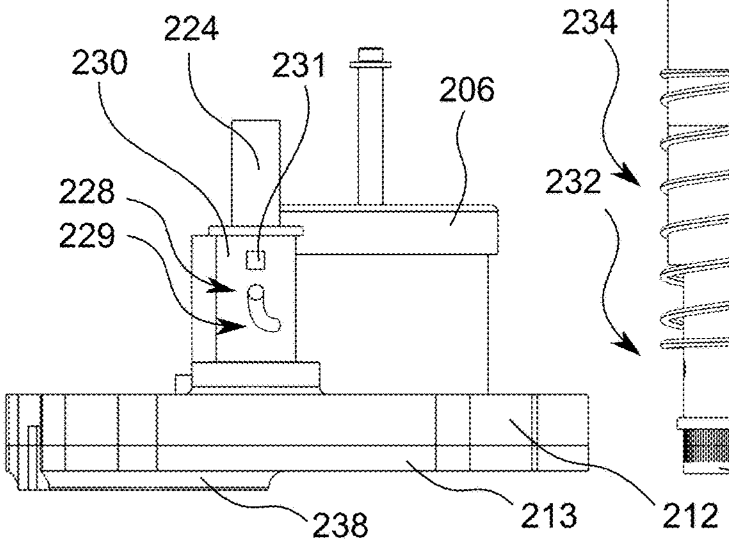
FIG. 13 illustrates an opposite side view of the tag dispenser without certain upper components.
Figure 14:
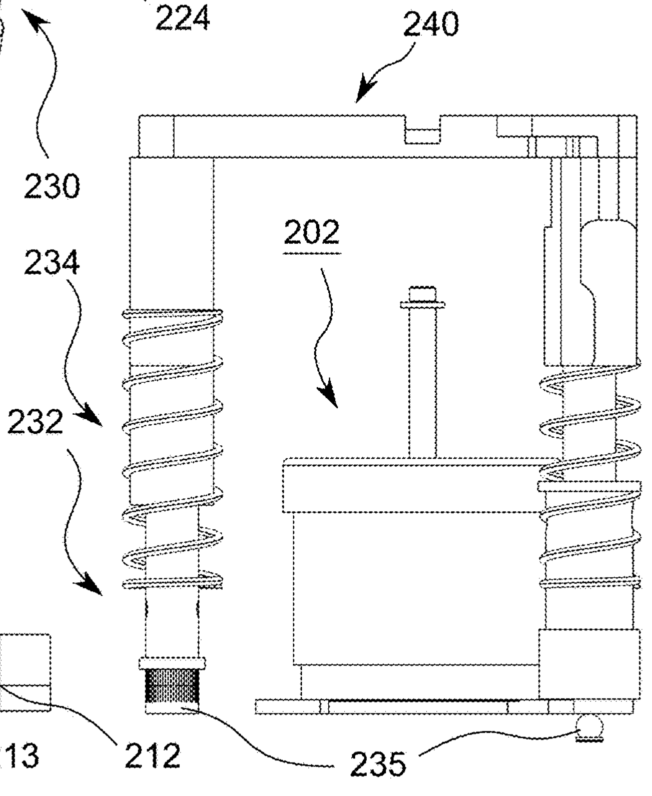
FIG. 14 illustrates a rear view of the tag dispenser as shown in FIG. 11.
Figure 15:
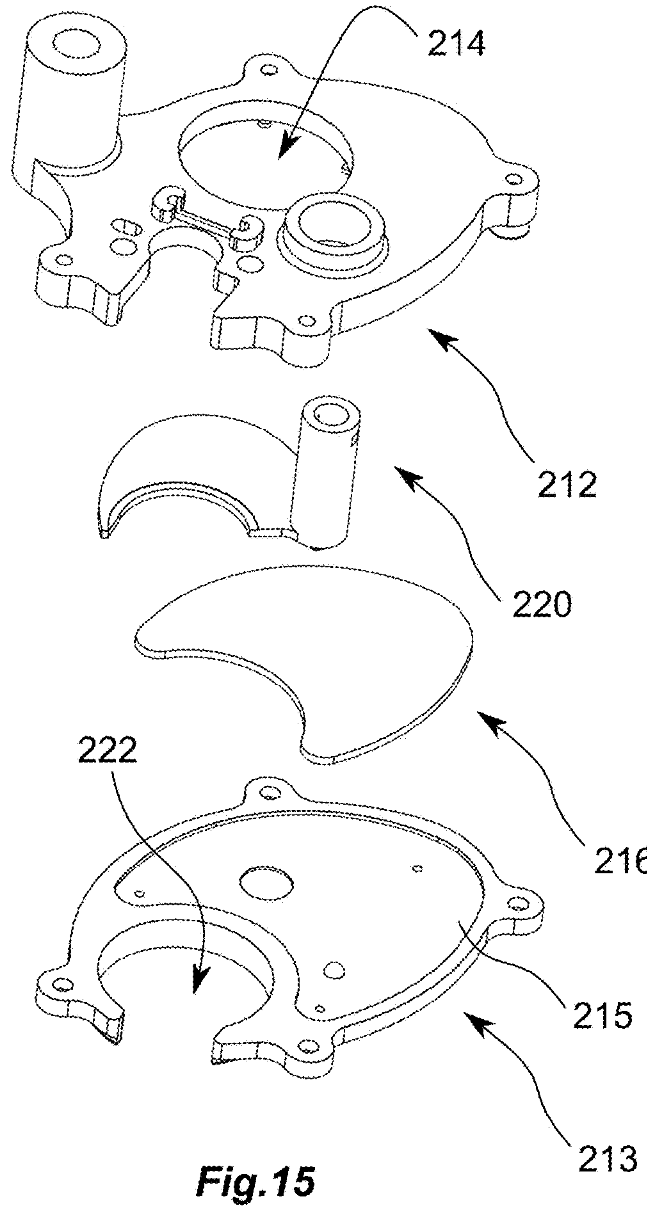
FIG. 15 illustrates an exploded top-rear perspective view of a lower housing and feeder of the tag dispenser of FIG. 6.

The rotation of wiper 220 may be accomplished with a pin 228 and 229 slot engagement, an embodiment of which is shown in FIG. 13. A pin 228 may be provided within shaft 224 for engagement with a slot 229 provided on a wiper barrel 230. As tag dispenser 200 is compressed, the pin and slot engagement would result in pin 228 travelling along an angled or curved slot 229 thereby rotating wiper 220 between the deployed and stored positions. A separate locking opening 231 may be provided within both shaft 224 and barrel 230 that could accommodate a locking pin (not shown) in order to prevent unintended rotation of wiper 220. This is an additional, contemplated safety feature.

A gun adapter 240 may be provided as part of tag dispenser 200 to attach the tag dispenser 200 with a nail gun 10. The illustrated embodiments in FIGS. 6-16 show an embodiment of a tag dispenser 10 attached to a prior art Metabo® Coil Roofing Nailer. Thus, attachment points 242 and the general shape of adapter 240 may be modified for use with other known or to be developed nail guns. In the various designs of tag dispenser 200, it will be appreciated that a path or opening will be provided to accommodate nail gun shaft 14. In the illustrated embodiments, adapter 240 includes a shaft cutout 244 and the upper segment 212 of lower housing 210 also includes a shaft cutout 244. The remaining components are sufficient offset from nail gun shaft 14 so as to permit a distal end of the nail gun shaft 14 to be positioned just above tag opening 222.

As discussed previously, to use the prior art nail gun 10 the user presses the gun against a surface 6 resulting in deployment of a nail into the surface. Tag dispenser may include two attachment points between adapter 240 and lower housing 220. On one side may be the wiper shaft 224 and wiper barrel 230. On the other side may be a stability shaft 232 and stability barrel 234. In telescoping fashion, the shafts 224, 232 may enter and exit their respective barrels 230, 234 as the tag dispenser is compressed during operation of the nail gun. The result is that the tag dispenser 200 is stably attached with the nail gun 10, and the wiper 220 operates upon compression to deploy tags stored in tag housing 202 into tag opening 222 which is aligned with the end of a nail gun shaft 14. The telescoping connection respectively occurs at wiper opening 225 and a stability shaft opening 231 provided as part of the upper segment 212 of lower housing 210. Caps 235 may be provided on the underside of lower segment 213 of lower housing 210 to ensure stability and retention of the telescoping shafts and barrels. Springs 236 may also be provided to promote reversion of tag dispenser 200 to its resting position after compression. A spacer 238 may also be provided on a bottom side of lower housing segment 213 so as to space any bottom side surfaces or components, such as a caps 235, from the nailing surface.

Illustrated embodiments show housing 130 as an integral component to nail gun 100 and tag dispenser 200 as an attachment to nail gun 10. It should be appreciated that housing 130 may be an attachment, and tag dispenser 200 may be integrated with nail gun 10.

It should also be appreciated that embodiments housing 130 and tag dispenser 200 may be utilized outside of roofing applications where tags 6 are dispensed. For example, a housing may dispense washers or nuts, and the power tool may be a motorized screwdriver.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims.

What is claimed:

1. A tag dispenser for a nail gun, the dispenser comprising:
- a tag housing including an internal compartment dimensioned to store a plurality of tags, a cap covering the internal compartment, a plunger head within the internal compartment, and a plunger shaft extending through an opening in the cap; and
- a lower housing connected with the tag housing, the lower housing including
  - an upper segment connectable with the tag housing, the upper segment including a wiper opening,
  - a lower segment joined with the upper segment
  - a wiper including a wiper shaft and a wiper edge, the wiper pivotable about a vertical axis extending through the wiper shaft, the wiper edge positioned to contact a tag of the plurality of tags at a bottom end of the tag housing, and
  - a tag opening, the wiper operable to push the tag from the bottom end of the tag housing into the tag opening,
- wherein a shaft of the nail gun is positioned proximate the tag opening such that a nail is deployable from the nail gun through the tag opening.

2. The tag dispenser of claim 1, further comprising an adapter for connecting the tag dispenser with the nail gun,
- wherein a pin is attached with the wiper shaft and a barrel is provided around the wiper shaft, the barrel including an angled or curved slot for receiving the pin, and
- wherein upon forcing the adapter towards the lower housing, the wiper shaft and barrel telescope and the pin traverses along the slot thereby pivoting the wiper.

3. The tag dispenser of claim 2 further comprising a stability shaft and a stability barrel connecting the adapter with the lower housing, the stability shaft and stability barrel telescope upon forcing the adapter towards the lower housing.

4. The tag dispenser of claim 3, wherein the stability shaft and stability barrel connect with the lower segment of the lower housing.

5. The tag dispenser of claim 1, wherein the wiper pivots between a deployed and stored position, and in the deployed position the wiper blocks at least a portion of the bottom end of the tag housing.

6. The tag dispenser of claim 5, wherein the lower segment of the lower housing includes a well and a pad positioned with the well.

7. The tag dispenser of claim 1, wherein the wiper edge includes a lip have a shape complimentary to the tag.

8. A nail gun comprising:

a gun shaft through which a nail may be deployed from a distal end of the shaft;

a lower housing positioned proximate the distal end of the shaft, the lower housing including an upper segment including a wiper opening, a lower segment joined with the upper segment, a wiper including a wiper shaft and a wiper edge, the wiper pivotable about a vertical axis extending through the wiper shaft, and a tag opening positioned adjacent the gun shaft in a path of nail deployment; and a tag housing connected with the lower housing, the tag housing including an internal compartment dimensioned to store a plurality of tags, a cap covering the internal compartment, a plunger having a plunger head within the internal compartment, and a plunger shaft extending through an opening in the cap, the tag housing positioned to feed the plurality of tags from the tag housing to the lower housing, wherein the wiper edge is operable to push a tag of the plurality of tags from a bottom end of the tag housing into the tag opening.

9. The nail gun of claim 8, wherein a pin is attached with the wiper shaft and a barrel is provided around the wiper shaft, the barrel including an angled or curved slot for receiving the pin, and wherein upon forcing the nail gun shaft into a surface to be nailed, the wiper shaft and barrel telescope and the pin traverses along the slot thereby pivoting the wiper.

10. The nail gun of claim 9 further comprising a stability shaft and a stability barrel that telescope upon forcing the adapter towards the lower housing.

11. The nail gun of claim 10, wherein the stability shaft and stability barrel connect with the lower segment of the lower housing.

12. The nail gun of claim 8, wherein the wiper pivots between a deployed and stored position, and in the deployed position the wiper blocks at least a portion of the bottom end of the tag housing.

13. The nail gun of claim 12, wherein the lower segment of the lower housing includes a well and a pad positioned with the well.

14. The nail gun of claim 8, wherein the wiper edge includes a lip have a shape complimentary to the tag.

15. A tag dispenser for a nail gun, the dispenser comprising:

a tag housing including an internal compartment dimensioned to store a plurality of tags;

a lower housing connected with the tag housing, the lower housing including an upper segment and a joined lower segment, the upper segment including a tag housing aperture dimensioned to connect with the tag housing, a pivotable wiper including a wiper shaft and an edge, the shaft extending through a wiper opening provided on the upper segment and the wiper pivotable about a vertical axis extending through the shaft, and a tag opening, the wiper operable to contact one of the plurality of tags and push the tag from a bottom end of the tag housing into the tag opening; and an adapter for connecting the tag dispenser with the nail gun, wherein a pin is attached with the wiper shaft and a barrel is provided around the wiper shaft, the barrel including an angled or curved slot for receiving the pin, wherein upon forcing the adapter towards the lower housing, the wiper shaft and barrel telescope and the pin traverses along the slot thereby pivoting the wiper, and wherein a shaft of the nail gun is positioned proximate the tag opening such that a nail is deployable from the nail gun through the tag opening.

16. The tag dispenser of claim 15, wherein the wiper pivots between a deployed and stored position, and in the deployed position the wiper blocks at least a portion of the bottom end of the tag housing, and wherein the lower segment of the lower housing includes a well and a pad positioned with the well.

17. The tag dispenser of claim 15 further comprising a stability shaft and a stability barrel that telescope upon forcing the adapter towards the lower housing.

18. The tag dispenser of claim 15, wherein the stability shaft and stability barrel connect with the lower segment of the lower housing.

19. A tag dispenser for a nail gun, the dispenser comprising:

a tag housing including an internal compartment dimensioned to store a plurality of tags; and a lower housing connected with the tag housing, the lower housing including an upper segment and a joined lower segment, the upper segment including a tag housing aperture dimensioned to connect with the tag housing, a pivotable wiper including a wiper shaft and an edge, the shaft extending through a wiper opening provided on the upper segment and the wiper pivotable about a vertical axis extending through the shaft, and a tag opening, the wiper operable to contact one of the plurality of tags and push the tag from a bottom end of the tag housing into the tag opening, wherein a shaft of the nail gun is positioned proximate the tag opening such that a nail is deployable from the nail gun through the tag opening, wherein the wiper pivots between a deployed and stored position, and in the deployed position the wiper blocks at least a portion of the bottom end of the tag housing, and wherein the lower segment of the lower housing includes a well and a pad positioned within the well.

20. A nail gun comprising:

a gun shaft through which a nail may be deployed from a distal end of the shaft;

a lower housing positioned proximate the distal end of the shaft, the lower housing including an upper segment, a lower segment joined with the upper segment, a pivotable wiper, and a tag opening, the tag opening positioned adjacent the gun shaft in a path of nail deployment; and a tag housing connected with the lower housing, the tag housing including an internal compartment dimensioned to store a plurality of tags positioned to feed the plurality of tags from the tag housing to the lower housing, wherein the wiper is operable to push a tag from a bottom end of the tag housing into the tag opening, wherein the wiper includes a wiper shaft extending through a wiper opening provided on the upper segment, and the wiper pivots about a vertical axis extending through the wiper shaft, wherein a pin is attached with the wiper shaft and a barrel is provided around the wiper shaft, the barrel including an angled or curved slot for receiving the pin, and wherein upon forcing the nail gun shaft into a surface to be nailed, the wiper shaft and barrel telescope and the pin traverses along the slot thereby pivoting the wiper.

21. The nail gun of claim 20, wherein the wiper pivots between a deployed and stored position, and in the deployed position the wiper blocks at least a portion of the bottom end of the tag housing, and wherein the lower segment of the lower housing includes a well and a pad positioned with the well.

22. The nail gun of claim 20, further comprising a stability shaft and a stability barrel that telescope upon forcing the adapter towards the lower housing.

23. The nail gun of claim 22, wherein the stability shaft and stability barrel connect with the lower segment of the lower housing.

24. A nail gun comprising:

a gun shaft through which a nail may be deployed from a distal end of the shaft;

a lower housing positioned proximate the distal end of the shaft, the lower housing including an upper segment, a lower segment joined with the upper segment, a pivotable wiper, and a tag opening, the tag opening positioned adjacent the gun shaft in a path of nail deployment; and a tag housing connected with the lower housing, the tag housing including an internal compartment dimensioned to store a plurality of tags positioned to feed the plurality of tags from the tag housing to the lower housing, wherein the wiper is operable to push a tag from a bottom end of the tag housing into the tag opening, wherein the wiper includes a wiper shaft extending through a wiper opening provided on the upper segment, and the wiper pivots about a vertical axis extending through the wiper shaft, wherein the wiper pivots between a deployed and stored position, and in the deployed position the wiper blocks at least a portion of the bottom end of the tag housing, and wherein the lower segment of the lower housing includes a well and a pad positioned with the well.

* * * * *